United States Patent
Sherman et al.

(10) Patent No.: US 9,734,847 B1
(45) Date of Patent: Aug. 15, 2017

(54) CHARACTERIZING A SENSING CIRCUIT OF A DATA STORAGE DEVICE

(71) Applicant: Western Digital (Fremont), LLC, Fremont, CA (US)

(72) Inventors: Paul Dylan Sherman, San Jose, CA (US); Tuyetanh Thi Dang, Stockton, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/063,696

(22) Filed: Mar. 8, 2016

(51) Int. Cl.
*G11B 5/09* (2006.01)
*G11B 20/10* (2006.01)
G11B 5/455 (2006.01)
G11B 27/36 (2006.01)
G11B 5/54 (2006.01)
G11B 5/012 (2006.01)
G11B 5/60 (2006.01)

(52) U.S. Cl.
CPC .......... *G11B 5/09* (2013.01); *G11B 20/10037* (2013.01); *G11B 5/012* (2013.01); *G11B 5/455* (2013.01); *G11B 5/54* (2013.01); *G11B 5/6005* (2013.01); *G11B 27/36* (2013.01)

(58) Field of Classification Search
None
See application file for complete search history.

(56) References Cited

U.S. PATENT DOCUMENTS

| 4,790,175 | A | 12/1988 | Himmelstein | |
|---|---|---|---|---|
| 5,539,779 | A | 7/1996 | Nagahori | |
| 6,603,356 | B1 | 8/2003 | Kim et al. | |
| 7,535,293 | B2 | 5/2009 | Jang | |
| 7,800,854 | B1 | 9/2010 | Tan et al. | |
| 7,812,747 | B2 | 10/2010 | Chen | |
| 8,085,491 | B2 * | 12/2011 | Antoku | G11B 5/6005 360/75 |
| 8,223,448 | B1 | 7/2012 | Haw et al. | |
| 8,582,231 | B1 * | 11/2013 | Kermiche | G11B 5/6076 360/31 |
| 8,625,214 | B2 * | 1/2014 | Takeuchi | G11B 27/36 360/31 |
| 8,681,445 | B1 * | 3/2014 | Kermiche | G11B 5/607 360/55 |
| 9,176,188 | B2 | 11/2015 | Chakraborty et al. | |
| 2012/0002319 | A1 * | 1/2012 | Kondo | G11B 5/3133 360/59 |
| 2012/0120522 | A1 * | 5/2012 | Johnson | G11B 5/607 360/75 |
| 2012/0262812 | A1 | 10/2012 | McGuire et al. | |
| 2014/0085745 | A1 * | 3/2014 | Powers | G11B 5/40 360/59 |
| 2014/0086034 | A1 * | 3/2014 | Matousek | G11B 27/36 369/53.41 |
| 2014/0368946 | A1 * | 12/2014 | Chou | G11B 5/6076 360/66 |

* cited by examiner

Primary Examiner — Tan X Dinh

(57) ABSTRACT

A data storage device is disclosed comprising a disk, a head for accessing the disk, and a sensor for generating an alternating sensor signal. The sensor is disconnected from an input of a sensing circuit and while the sensor is disconnected an alternating calibration signal is injected into the input of the sensing circuit, wherein the alternating calibration signal comprises a predetermined offset and amplitude. A response of the sensing circuit to the alternating calibration signal is evaluated to detect at least one of an offset and a gain of the sensing circuit.

13 Claims, 7 Drawing Sheets

CHARACTERIZING A SENSING CIRCUIT OF A DATA STORAGE DEVICE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable fly height actuator may be employed, such as a heater which controls fly height through thermal expansion, or a piezoelectric (PZT) actuator. It is desirable to determine the appropriate fly height actuator control signal (e.g., appropriate current applied to a heater) that achieves the target fly height for the head.

A data storage device may comprise one or more sensors used for any suitable purpose, such as to determine the control signal applied to the fly height actuator that causes the head to contact the disk surface (touchdown detection). The operating fly height may then be achieved by backing off from the fly height actuator control signal that causes touchdown. In another application, a sensor may be fabricated within the head to detect defects on the disk surface, such as asperities, scratches, pits, etc.

DETAILED DESCRIPTION

Figure 1A:
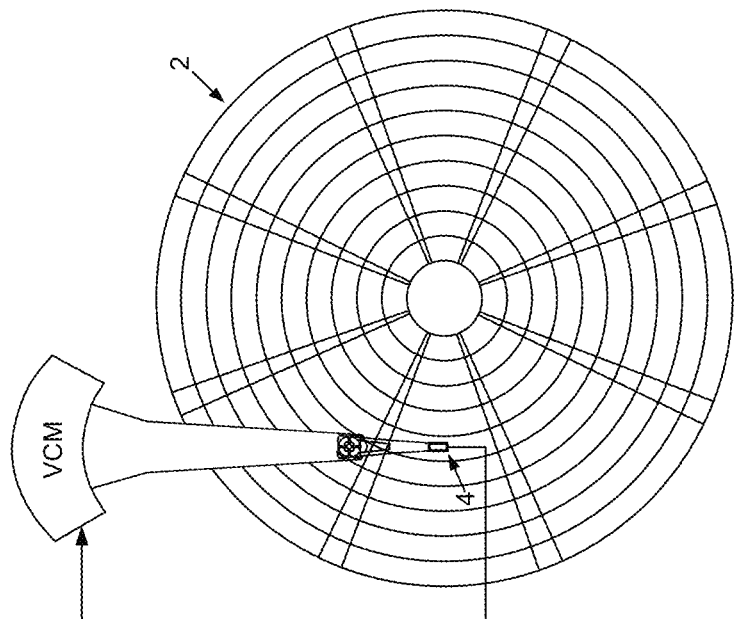
FIG. 1A shows a data storage device in the form of a disk drive according to an embodiment comprising a disk and a head for accessing the disk.

FIG. 1A shows a data storage device in the form of a disk drive according to an embodiment comprising a disk 2, a head 4 for accessing the disk 2, and a sensor 6 (FIG. 1B) for generating an alternating sensor signal 8. The disk drive further comprises control circuitry 10 configured to execute the flow diagram of FIG. 1C, wherein the sensor 6 is disconnected from an input 11 of a sensing circuit 12 (block 14) and while the sensor 6 is disconnected an alternating calibration signal 16 is injected into the input 11 of the sensing circuit 12 (block 20), wherein the alternating calibration signal 16 comprises a predetermined offset and amplitude. A response of the sensing circuit 12 to the alternating calibration signal 16 is evaluated to detect at least one of an offset and a gain of the sensing circuit 12 (block 22).

Figure 1B:
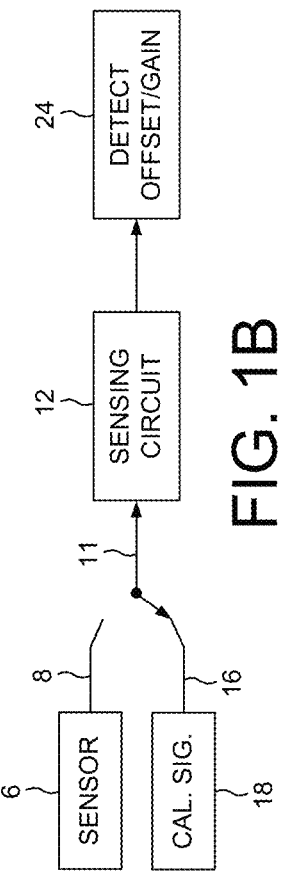
FIG. 1B shows control circuitry according to an embodiment comprising a sensing circuit having an input connected to an alternating calibration signal having a predetermined offset and amplitude.

The sensing circuit 12 in FIG. 1B may process any suitable alternating sensor signal 8 generated by any suitable sensor 6 during normal operation of the disk drive. For example, in one embodiment the sensor 6 may comprise a fly height sensor or a touchdown sensor integrated into the slider of the head 4, wherein an amplitude of the alternating sensor signal 8 may represent a fly height (or touchdown) of the head 4 over the disk 2. In another embodiment, the sensor 6 may be the read element integrated into the slider of the head 4 (e.g., a magnetoresistive (MR) read element), wherein the alternating sensor signal 8 may represent the read signal when reading data from the disk. In yet another embodiment, the sensor 6 may comprise a component of an actuator configured to actuate the head 4 over the disk 2, such as a voice coil motor (VCM) and/or a microactuator integrated into the head 4, the head gimbal assembly (HGA), or the suspension.

Regardless as to the type of sensor 6 employed, in one embodiment the sensing circuit 12 may exhibit an unknown offset and/or gain due, for example, to manufacturing tolerances and/or changes in environmental conditions, such as changes in temperature. Accordingly, in one embodiment the offset and/or gain of the sensing circuit 12 may be detected by injecting an alternating calibration signal 16 into the sensing circuit 12 and evaluating the response. In one embodiment, a parameter of the sensing circuit 12 may be adjusted based on at least one of the detected offset and/or the detected gain so that the sensing circuit 12 exhibits a nominal response to the alternating sensor signal 8 during normal operation of the disk drive. Any suitable control circuitry may be employed to generate the alternating calibration signal 16 at block 18 of FIG. 1B, such as any suitable oscillator circuit comprising a suitable resonant element (e.g., capacitor, inductor, piezoelectric, crystal, etc.).

Figure 2A:
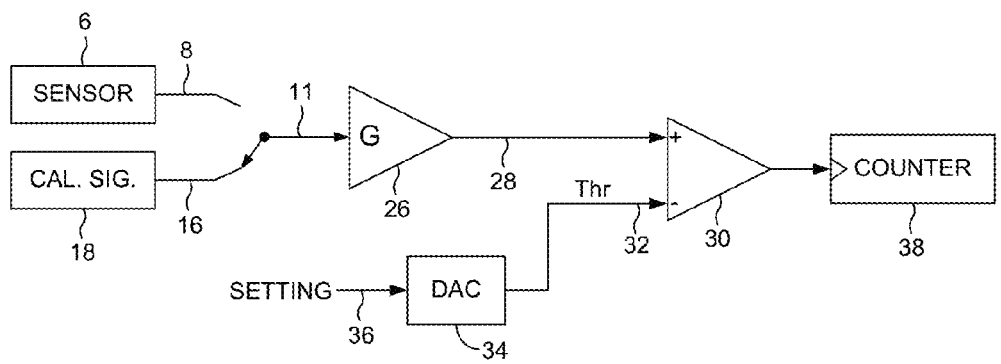
FIG. 2A shows control circuitry according to an embodiment wherein a counter counts a number of times the alternating calibration signal exceeds a threshold.

In the embodiment of FIG. 1B, any suitable sensing circuit 12 and offset/gain detector 24 may be employed in the embodiments, such as the control circuitry shown in FIG. 2A wherein the input 11 of the sensing circuit is amplified by a gain circuit 26.

The amplified signal 28 is compared at comparator 30 to a threshold voltage 32 generated by a digital-to-analog converter (DAC) 34 which is configured based on a programmable input setting 36. In the embodiment of FIG. 2A, a counter 38 is incremented each time the amplified signal 28 exceeds the threshold voltage 32 at the comparator 30, wherein the output of the counter 38 may be evaluated after a predetermined interval in order to detect the amplitude of the alternating sensor signal 8.

Any of the analog components in the sensing circuit 12 of FIG. 2A may exhibit an unknown offset and/or gain that may impact the accuracy of the output, such as the gain circuit 26, the comparator 30 and/or the DAC 34. For example, an uncompensated offset and/or gain in the sensing circuit 12 may translate into an abnormally large signal amplitude detected by the counter 38. Accordingly, in one embodiment the offset and/or gain of the sensing circuit 12 is detected by injecting an alternating calibration signal 16 into the input 11 and evaluating the response of the sensing circuit 12.

Figure 2B:
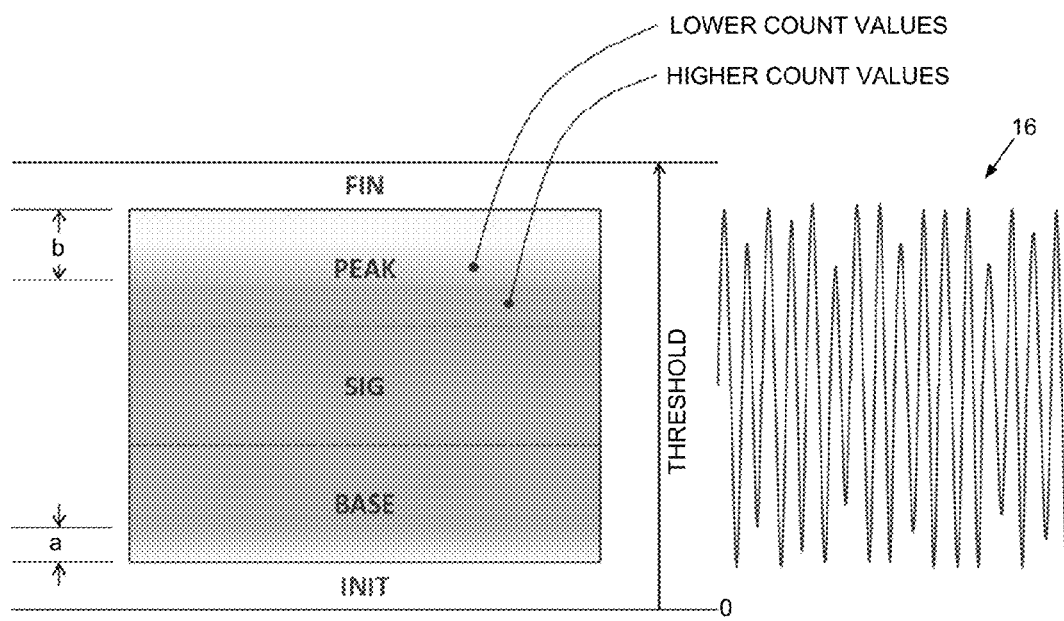
FIG. 2B shows an embodiment wherein different signal levels for the alternating calibration signal are detected by adjusting the threshold.
Figure 3:
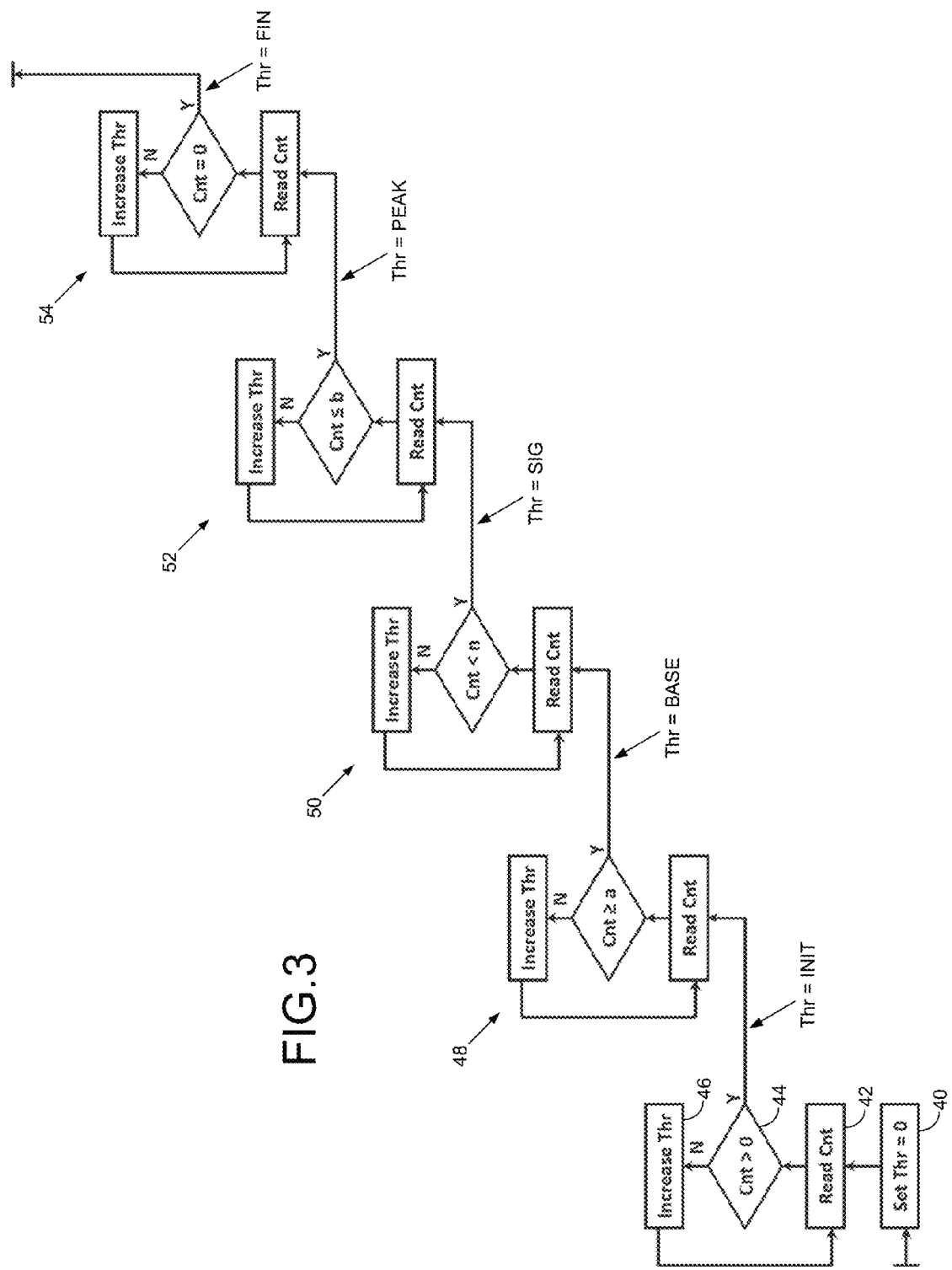
FIG. 3 is a flow diagram according to an embodiment wherein five different signal levels for the alternating calibration signal are detected by adjusting the threshold.

FIG. 2B shows an example alternating calibration signal 16 having a predetermined positive offset and a predetermined amplitude that is injected into the input 11 of the sensing circuit 12. FIG. 3 is a flow diagram according to an embodiment for detecting at least one of the offset and/or gain of the sensing circuit 12 which is understood with reference to FIG. 2B. The threshold 32 of the sensing circuit 12 is initialized to zero (block 40) and the counter 38 is read (block 42) after a predetermined interval. If the count value does not exceed zero (block 44), then the threshold 32 is increased and the flow diagram repeated until the count value does exceed zero at block 44) at which point the threshold 32 represents the INIT level shown in FIG. 2B. In one embodiment, the counter 38 is reset and a similar operation executed (blocks 48) until the count value exceeds a predetermined value ("a" value) at which point the threshold 32 presents the BASE level shown in FIG. 2B. In one embodiment, the counter 38 is reset after each interval such that the flow at blocks 48 terminates when the count value exceeds the "a" value over the predetermined interval. The counter 38 is reset and a similar operation executed (blocks 50) until the count value falls below a predetermined value ("n" value) at which point the threshold 32 represents the SIG level shown in FIG. 2B. The counter 38 is reset and a similar operation executed (blocks 52) until the count value falls below a predetermined value ("b" value) at which point the threshold 32 represents the PEAK level shown in FIG. 2B. The counter 38 is reset and a similar operation executed (blocks 54) until the count value is zero at which point the threshold 32 represents the FIN level shown in FIG. 2B.

Figure 1C:
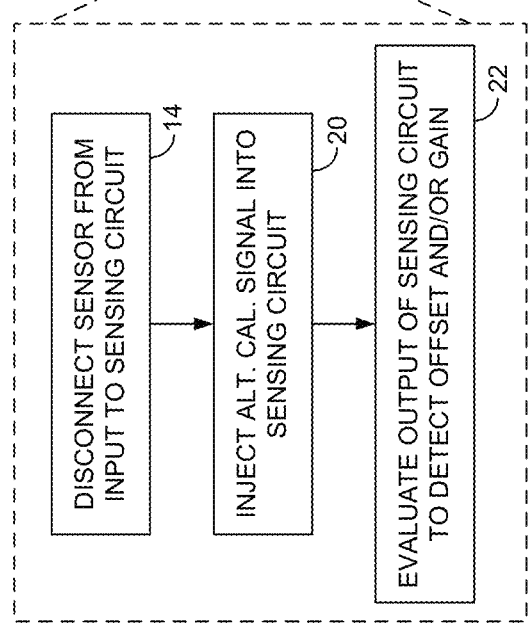
FIG. 1C is a flow diagram according to an embodiment wherein the output of the sensor is evaluated to detect at least one of an offset and a gain of the sensing circuit in response to the alternating calibration signal.
Figure 4:
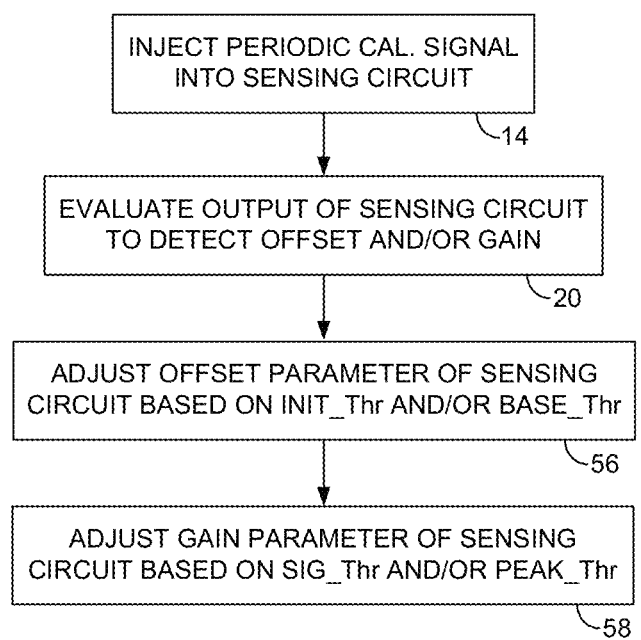
FIG. 4 is a flow diagram according to an embodiment wherein an offset parameter and a gain parameter of the sensing circuit is adjusted based on at least one of the detected signal levels.

FIG. 4 is a flow diagram which extends on the flow diagram of FIG. 1C, wherein after determining the signal levels shown in FIG. 2B the offset of the sensing circuit 12 may be detected based on the INIT threshold and/or the BASE threshold, and a corresponding adjustment may be made (block 56) to compensated for the detected offset. In one embodiment, the offset of the sensing circuit 12 may be detected as the average of the INIT threshold and the BASE threshold. Referring again to FIG. 4, the gain of the sensing circuit 12 may be detected based on the SIG threshold and/or the PEAK threshold, and a corresponding adjustment may be made (block 58) to compensate for the detected gain error. In one embodiment, the gain of the sensing circuit 12 may be detected based on a difference between the SIG threshold and the INIT threshold, and/or based on a difference between the PEAK threshold and the BASE threshold, and/or based on an average of the differences. In one embodiment, offset and/or gain adjustments may be made to the sensing circuit 12 until the signal levels shown in FIG. 2B substantially match target levels for all five signal levels (INIT, BASE, SIG, PEAK and FIN).

Figure 5A:
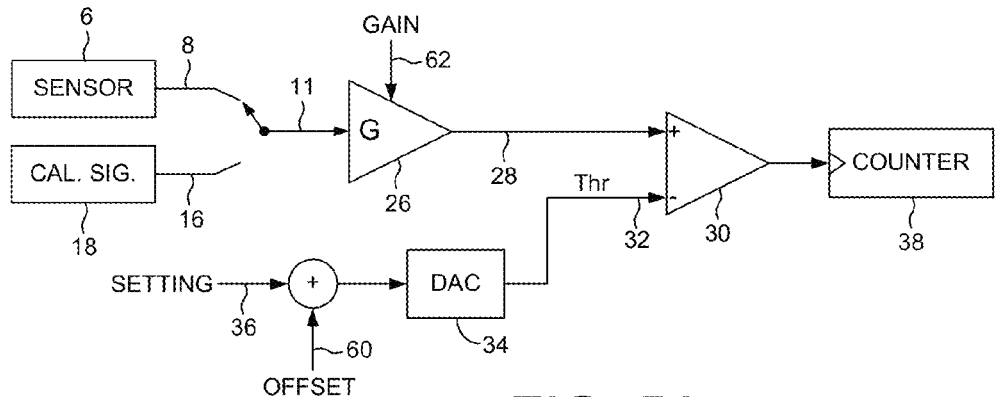
FIG. 5A shows an embodiment wherein the offset parameter of the sensing circuit comprises an offset added to the input setting of a digital-to-analog converter (DAC) and the gain parameter comprises a gain setting for an amplifier.

In one embodiment, a suitable parameter of the sensing circuit 12 may be adjusted to compensate for an error in the offset and/or the gain. FIG. 5A shows an embodiment wherein an offset 60 that is added to the input setting 36 for the DAC 34 may be adjusted to compensate for an offset error of the sensing circuit 12. Also in the embodiment of FIG. 5A, the gain 62 of the gain circuit 26 may be adjusted to compensate for a gain error of the sensing circuit 12. In one embodiment, the offset 60 and/or the gain 62 may be adjusted and the flow diagram of FIG. 3 repeated until the offset and/or gain of the sensing circuit 12 exhibit a nominal response as determined from the measured signal levels as shown in FIG. 2B.

Figure 5B:
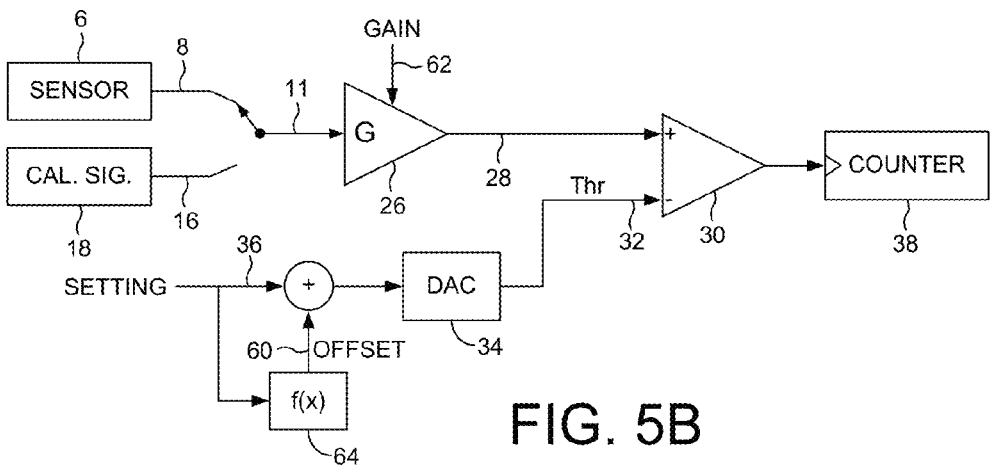
FIG. 5B shows an embodiment wherein the offset added to the input setting of the DAC is generated as a function of the input setting.

In one embodiment, the offset and/or gain of the sensing circuit 12 may exhibit a non-linear error. For example, in one embodiment the DAC 34 may exhibit a non-linear offset relative to the amplitude of the input setting 36. FIG. 5B shows an embodiment wherein the offset 60 added to the input setting 36 of the DAC 34 may be generated as a function 64 of the input setting 36. In one embodiment, the function 64 may be determined by adjusting the amplitude of the alternating calibration signal 16 and measuring the signal levels as shown in FIG. 2B by executing the flow diagram of FIG. 3 at the different amplitude levels of the alternating calibration signal.

Figure 5C:
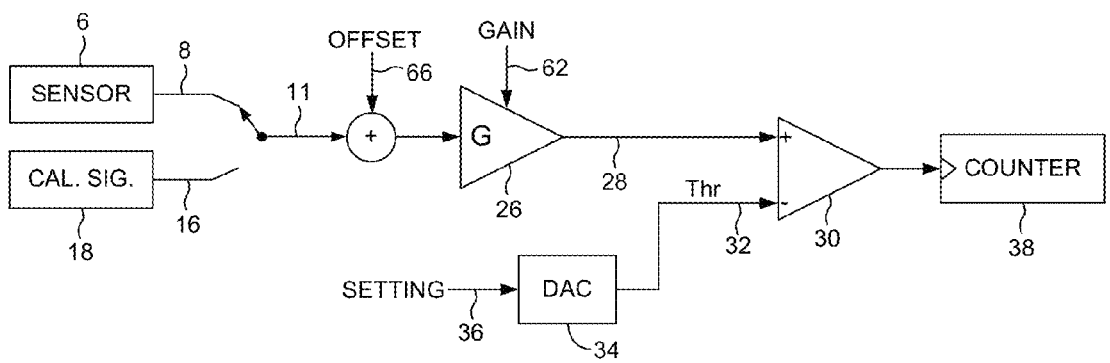
FIG. 5C shows an embodiment wherein the offset parameter of the sensing circuit comprises an offset added to the alternating sensor signal.

In another embodiment shown in FIG. 5C, the offset of the sensing circuit 12 may be adjusted in the analog domain, such as by adding an analog offset 66 to the input 11 of the sensing circuit 12. In another embodiment, the analog offset 66 may be added to the output of the gain circuit 26. In yet another embodiment, the analog offset 66 may be added to the output of the DAC 34. Regardless as to how the offset and/or gain of the sensing circuit 12 are compensated, in one embodiment the adjustment to the sensing circuit 12 achieves a nominal response to the alternating calibration signal 16 and therefore a nominal response to the alternating sensor signal 8 during normal operation of the disk drive.

Figure 6:
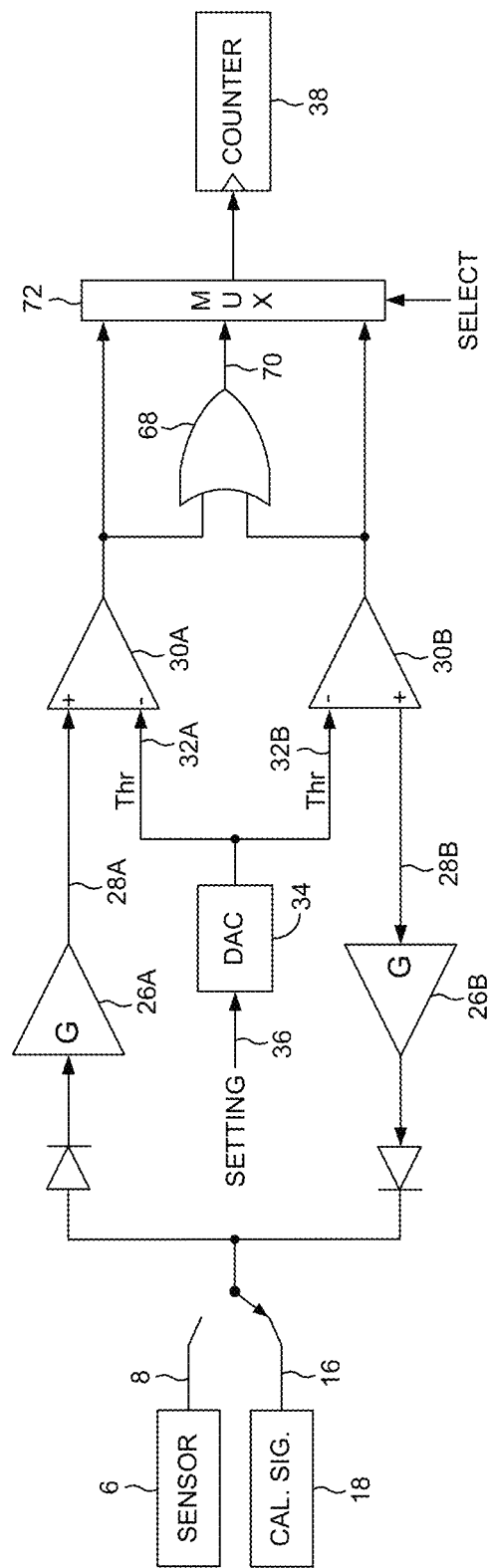
FIG. 6 shows a sensing circuit according to an embodiment configured to detect positive and negative peaks of the alternating sensor signal.

FIG. 6 shows a sensing circuit 12 according to an embodiment capable of detecting the positive and negative amplitude of a dual polarity alternating sensor signal 8. In the embodiment of FIG. 6, the components of the sensing circuit 12 described above with reference to FIG. 2A are duplicated in order to detect the negative amplitude of the alternating sensor signal 8. An OR-gate 68 generates a combined signal 70 that is active when the amplitude of the alternating sensor signal 8 exceeds either the positive threshold 32A at comparator 30A or the negative threshold 32B at comparator 30B. A multiplexer 72 is configured to select the output from either comparator 30A or 30B or the combined signal 70 in order to drive the counter 38. Accordingly, the counter 38 may count the threshold crossings for either or both the positive or negative amplitudes of the alternating sensor signal 8. In one embodiment, the flow diagram of FIG. 3 may be executed to measure the signal levels of the alternating calibration signal for either or both of the positive or negative amplitudes. In one embodiment, the control circuitry may calibrate offset and/or gain adjustments for the sensing circuit 12 that may be applied when sensing the positive amplitude or when sensing the negative amplitude. For example, the input setting 36 of the DAC 34 may be adjusted using an offset 60 such as shown in FIG. 5A depending on whether the sensing circuit 12 is configured to sense the positive amplitude or the negative amplitude of the alternating sensor signal 8. In another embodiment, an offset and/or gain adjustment may be made to both the positive amplitude leg and the negative amplitude leg of the sensing circuit shown in FIG. 6 to enable the simultaneous detection of both the positive amplitude and negative amplitude of the alternating sensor signal 8.

Figure 7:
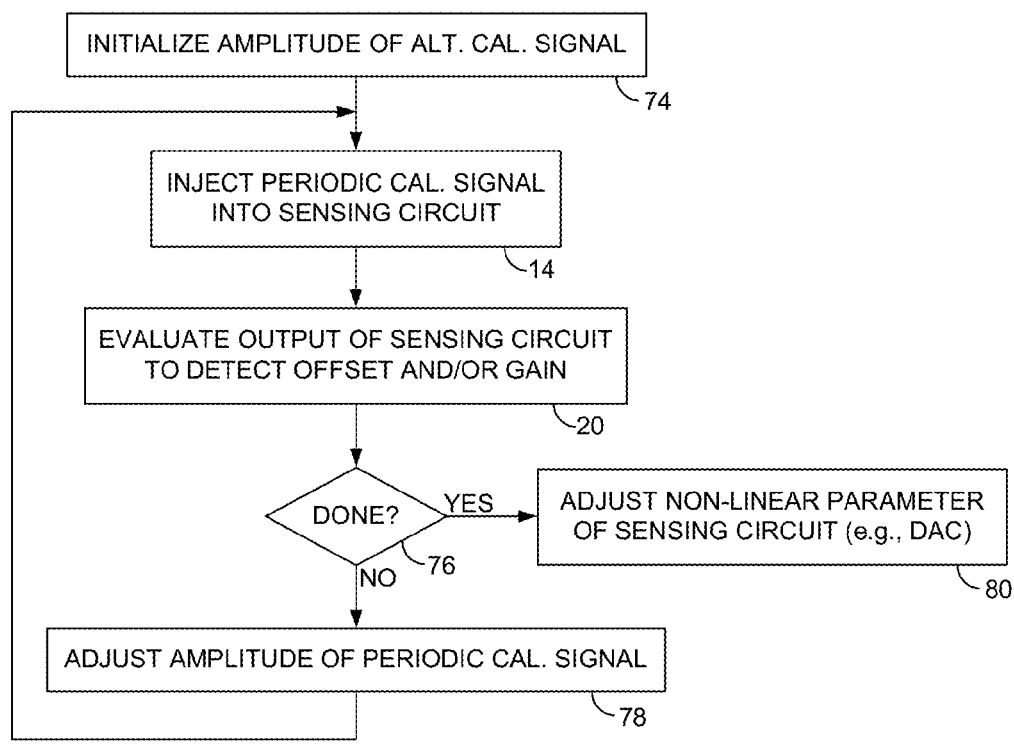
FIG. 7 is a flow diagram according to an embodiment wherein an amplitude of the alternating calibration signal is adjusted in order to adjust a non-linear parameter of the sensing circuit (e.g., the DAC).

FIG. 7 shows a flow diagram according to an embodiment which extends on the flow diagram of FIG. 1C, wherein the amplitude of the alternating calibration signal is initialized, for example, to a low level (block 74). The alternating calibration signal is then injected into the input of the sensing circuit (block 14) in order to detect the offset and/or gain of the sensing circuit at the current amplitude of the alternating calibration signal (block 20). The flow diagram is then repeated after adjusting (e.g., increasing) the amplitude of the alternating calibration signal (block 78). Once the offset and/or gain of the sensing circuit has been detected over a range of amplitudes for the alternating calibration signal (block 76), a non-linear parameter of the sensing circuit is adjusted in order to compensate for a non-linear response (block 80). For example, in one embodiment the DAC 34 may exhibit a non-linear response to the amplitude of the input setting 36 which may vary based on the amplitude of the alternating sensor signal 8 being evaluated. Accordingly, in one embodiment the offset 60 added to the input setting 36 may be generated as a function 64 of the input setting 36 as illustrated in FIG. 5B, wherein the function 64 may be calibrated by executing the flow diagram of FIG. 7.

In one embodiment, the offset and/or gain of the sensing circuit 12 may vary due to changes in environmental conditions, such as changes in temperature. Accordingly, in one embodiment the response of the sensing circuit 12 may be evaluated over different environmental conditions in order to detect (and optionally compensate) for an offset and/or gain error over the different environmental conditions. In one embodiment, the control circuitry may employ one or more environmental sensors (e.g., a temperature sensor) in order to adjust the offset and/or gain compensation for the sensing circuit 12 during the normal operating mode of the disk drive as needed in response to changes in environmental conditions.

In one embodiment, each production disk drive may comprise the control circuitry 18 shown in FIG. 1B needed to generate the alternating calibration signal 16. In this embodiment, each production disk drive may measure the response of the sensing circuit 12 by generating and injecting the alternating calibration signal 16 into the input 11 of the sensing circuit 12. In an alternative embodiment, each production disk drive may be inserted into a manufacturing test station that comprises the control circuitry 18 shown in FIG. 1B needed to generate the alternating calibration signal 16 that is injected into the input 11 of the sensing circuit 12. Accordingly, in this embodiment the data storage device may comprise a production disk drive inserted into a manufacturing test station. In one embodiment, the manufacturing test station may evaluate the measured response of the sensing circuit 12 in order to configure each production disk drive with appropriate compensation parameters, and in another embodiment the control circuitry within each production disk drive may measure the response and configure the compensation parameters.

In one embodiment, the data storage device may comprise a manufacturing test station that is used to perform any suitable manufacturing process on a plurality of production disk drives, such as a calibrating or screening process. In one embodiment, there may be a number of similar test stations that perform the same calibrating or screening process on a number of the production disk drives in an assembly line fashion. When calibrating and/or screening the production disk drive, it may be desirable for the sensing circuit 12 employed in each manufacturing test station to exhibit essentially the same response in terms of offset and/or gain so that the production disk drives are all calibrated similarly and/or screened out as defective using a consistent test criteria. Accordingly, in one embodiment the sensing circuit 12 within each manufacturing test station may be evaluated by executing the flow diagram of FIG. 3 to detect the signal levels of the alternating calibration signal as shown in FIG. 2B. Each sensing circuit within each manufacturing test station may then be adjusted to exhibit essentially the same response in terms of offset and/or gain. In one embodiment, the flow diagram of FIG. 3 may be executed for each sensing circuit 12 prior to installing the sensing circuit 12 into a manufacturing test station. That is, there may be a dedicated station for measuring the response of each sensing circuit 12 and for configuring each sensing circuit 12 with compensation values prior to inserting the sensing circuit 12 into the manufacturing test station used to test the production disk drives.

Any suitable control circuitry may be employed in a data storage device or test station to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as test stations, magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. Control circuitry configured to measure at least one of an offset and gain of a sensing circuit for use in a data storage device, the control circuitry configured to:
   inject an alternating calibration signal into an input of the sensing circuit, wherein the alternating calibration signal comprises a predetermined offset and amplitude;
   initialize a threshold to an initial setting;
   first count a number of times the alternating calibration signal exceeds the initial threshold;
   adjust the threshold;
   second count a number of times the alternating calibration signal exceeds the adjusted threshold; and
   detect at least one of the offset and gain of the sensing circuit based at least on the second count.

2. The control circuitry as recited in claim 1, wherein the control circuitry is further configured to adjust a parameter of the sensing circuit based on at least one of the detected offset and the detected gain of the sensing circuit.

3. The control circuitry as recited in claim 2, wherein:
   the sensing circuit comprises a comparator for comparing an alternating sensor signal to a threshold; and
   the parameter comprises the threshold.

4. The control circuitry as recited in claim 2, wherein:
   the sensing circuit comprises an adder for adding an offset to an alternating sensor signal; and
   the parameter comprises the added offset.

5. The control circuitry as recited in claim 2, wherein:
   the sensing circuit comprises an amplifier for amplifying an alternating sensor signal; and
   the parameter comprises a gain of the amplifier.

6. The control circuitry as recited in claim 1, wherein the control circuitry is further configured to adjust the threshold until the second count is at least one.

7. The control circuitry as recited in claim 1, wherein the control circuitry is further configured to adjust the threshold until the second count rises above a predetermined level.

8. The control circuitry as recited in claim 1, wherein the control circuitry is further configured to adjust the threshold until the second count falls below a predetermined level.

9. The control circuitry as recited in claim 1, wherein the control circuitry is further configured to:
   adjust an amplitude of the alternating calibration signal; and
   evaluate a response of the sensing circuit to the adjusted alternating calibration signal.

10. The control circuitry as recited in claim 9, wherein the control circuitry is further configured to adjust a non-linear component of the sensing circuit based on the response of the sensing circuit to the adjusted alternating calibration signal.

11. The control circuitry as recited in claim 10, wherein the non-linear component of the sensing circuit comprises a digital-to-analog converter.

12. A test station comprising control circuitry configured to measure at least one of an offset and gain of a sensing circuit for use in a data storage device, the control circuitry configured to:
   inject an alternating calibration signal into an input of the sensing circuit, wherein the alternating calibration signal comprises a predetermined offset and amplitude;
   initialize a threshold to an initial setting;
   first count a number of times the alternating calibration signal exceeds the initial threshold;
   adjust the threshold;
   second count a number of times the alternating calibration signal exceeds the adjusted threshold; and
   detect at least one of the offset and gain of the sensing circuit based at least on the second count.

13. A method of measuring at least one of an offset and gain of a sensing circuit for use in a data storage device, the method comprising:
   injecting an alternating calibration signal into an input of the sensing circuit, wherein the alternating calibration signal comprises a predetermined offset and amplitude;
   initializing a threshold to an initial setting;
   first counting a number of times the alternating calibration signal exceeds the initial threshold;
   adjusting the threshold;
   second counting a number of times the alternating calibration signal exceeds the adjusted threshold; and
   detecting at least one of the offset and gain of the sensing circuit based at least on the second count.

* * * * *